US012218474B2

(12) United States Patent
Hamaguchi et al.

(10) Patent No.: US 12,218,474 B2
(45) Date of Patent: Feb. 4, 2025

(54) TERMINAL-EQUIPPED WIRE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takaaki Hamaguchi, Mie (JP); Takashi Kawakami, Mie (JP); Kazuo Nakashima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 32 days.

(21) Appl. No.: 18/011,327

(22) PCT Filed: Jun. 21, 2021

(86) PCT No.: PCT/JP2021/023362
§ 371 (c)(1),
(2) Date: Dec. 19, 2022

(87) PCT Pub. No.: WO2022/004458
PCT Pub. Date: Jan. 6, 2022

(65) Prior Publication Data

US 2023/0238719 A1 Jul. 27, 2023

(30) Foreign Application Priority Data

Jun. 29, 2020 (JP) ................................ 2020-112050

(51) Int. Cl.
*H01R 4/72* (2006.01)
*H01R 4/58* (2006.01)
*H01R 11/12* (2006.01)

(52) U.S. Cl.
CPC ................ *H01R 4/72* (2013.01); *H01R 4/58* (2013.01); *H01R 11/12* (2013.01)

(58) Field of Classification Search
CPC ................................ H01R 4/72; H01R 11/28
See application file for complete search history.

(56) References Cited

U.S. PATENT DOCUMENTS 5,804,767 A * 9/1998 Winfield ............. H02G 15/184 174/76
2015/0047900 A1 2/2015 Suetani et al.

FOREIGN PATENT DOCUMENTS

JP 2010-165630 * 7/2010
JP 2014-107212 A 6/2014
(Continued)

OTHER PUBLICATIONS

International Search Report issued on Sep. 14, 2021 for WO 2022/004458 A1 (4 pages).

*Primary Examiner* — Chau N Nguyen
(74) *Attorney, Agent, or Firm* — Venjuris, P.C.

(57) ABSTRACT

A terminal-equipped wire for charging inlet is provided with a wire including a conductor and an insulation coating, and a terminal to be connected to the conductor exposed from an end part of the wire. The insulation coating has an olefin-based resin as a main component. The terminal-equipped wire is further provided with a heat shrinkable tube for covering a region from a connection point of the conductor and the terminal to the insulation coating, and a primer layer provided between an inner peripheral surface of the heat shrinkable tube and an outer peripheral surface of the
(Continued)

terminal. The inner peripheral surface of the heat shrinkable tube and an outer peripheral surface of the insulation coating are directly in contact.

4 Claims, 1 Drawing Sheet

(56) References Cited

FOREIGN PATENT DOCUMENTS

| | | | |
|---|---|---|---|
| JP | 2015-118832 | * | 6/2015 |
| JP | 2016-115579 | * | 6/2016 |
| JP | 2017-079155 A | | 4/2017 |
| JP | 2018-133278 A | | 8/2018 |

* cited by examiner

TERMINAL-EQUIPPED WIRE

CROSS REFERENCE TO RELATED APPLICATIONS

This application is a national phase of PCT application No. PCT/JP2021/023362, filed on 21 Jun. 2021, which claims priority from Japanese patent application No. 2020-112050, filed on 29 Jun. 2020, all of which are incorporated herein by reference.

TECHNICAL FIELD

The present disclosure relates to a terminal-equipped wire.

BACKGROUND

Patent Document 1 discloses a charging inlet provided in an electrically driven vehicle such as a hybrid vehicle. The charging inlet includes a housing for accommodating the tip of a terminal-equipped wire. The terminal-equipped wire for charging inlet includes a wire, a terminal and a water stop portion. The wire includes a conductor and an insulation coating covering the outer periphery of the conductor. The terminal is connected to the conductor exposed from the insulation coating in an end part of the wire. The water stop portion covers a region from a connection point of the conductor and the terminal to the insulation coating of the wire. The water stop portion suppresses the corrosion of the conductor and the terminal due to the adhesion of moisture to the connection point of the conductor and the terminal and the like.

PRIOR ART DOCUMENT

Patent Document

Patent Document 1: JP 2018-133278 A

SUMMARY OF THE INVENTION

Problems to be Solved

A terminal-equipped wire of the present disclosure is a terminal-equipped wire for charging inlet with a wire including a conductor and an insulation coating, the insulation coating having an olefin-based resin as a main component, a terminal to be connected to the conductor exposed from an end part of the wire, a heat shrinkable tube for covering a region from a connection point of the conductor and the terminal to the insulation coating, and a primer layer provided between an inner peripheral surface of the heat shrinkable tube and an outer peripheral surface of the terminal, the inner peripheral surface of the heat shrinkable tube and an outer peripheral surface of the insulation coating being directly in contact.

MEANS TO SOLVE THE PROBLEM

Figure 1:
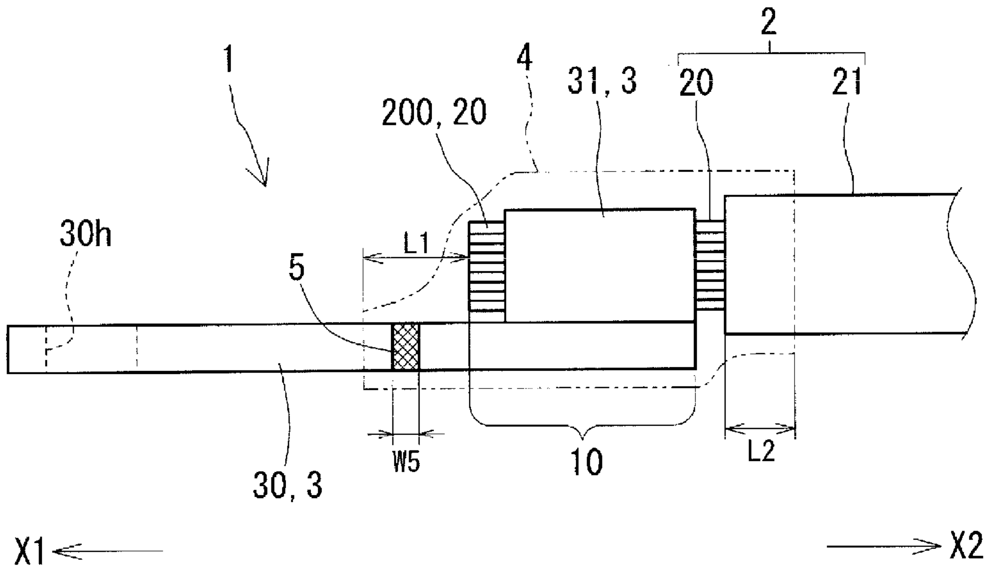
FIG. 1 is a schematic side view of a terminal-equipped wire for charging inlet according to one embodiment.

With the recent year development of electrically driven vehicles, a terminal-equipped wire for charging inlet tends to be used with a large current. Thus, a cross-sectional area of the wire tends to increase. It is difficult to bond a water stop portion to a large-diameter wire without gaps. Further, a conductor of the wire in which the large current flows tends to have a high temperature and the water stopping performance of the water stop portion may be reduced by a temperature increase. Therefore, it is desired to further improve the water stopping performance of the water stop portion and make the water stopping performance difficult to drop over a long period of time in the terminal-equipped wire for charging inlet.

One object of the present disclosure is to provide a terminal-equipped wire with a water stop portion excellent in water stopping performance.

Effect of the Invention

The terminal-equipped wire of the present disclosure is provided with a heat shrinkable tube serving as a water stop portion excellent in water stopping performance and reliability.

Detailed Description to Execute the Invention

Description of Embodiments of Present Disclosure

The present inventors studied the configuration of a water stop portion in a terminal-equipped wire for charging inlet. In a terminal-equipped wire used with a large current, the number of strands constituting a conductor increases. If the number of the strands increases, more air is present in gaps between the strands. Accordingly, when the conductor generates heat due to the large current, a pressure inside an insulation coating is increased by air expansion. The present inventors acquired such knowledge that a considerable load was applied to the water stop portion due to this increase in the inner pressure of the wire. Based on this knowledge, the present inventors completed a terminal-equipped wire for charging inlet having a structure capable of withstanding an inner pressure increase of a wire. Embodiments of the present disclosure are listed and described below.

(1) A terminal-equipped wire according to an embodiment is a terminal-equipped wire for charging inlet with a wire including a conductor and an insulation coating, the insulation coating having an olefin-based resin as a main component, a terminal to be connected to the conductor exposed from an end part of the wire, a heat shrinkable tube for covering a region from a connection point of the conductor and the terminal to the insulation coating, and a primer layer provided between an inner peripheral surface of the heat shrinkable tube and an outer peripheral surface of the terminal, the inner peripheral surface of the heat shrinkable tube and an outer peripheral surface of the insulation coating being directly in contact.

Here, the “main component” in this specification is a component most contained in a member.

The terminal-equipped wire according to the embodiment is provided with the heat shrinkable tube excellent in water stopping performance and reliability.

The heat shrinkable tube of the terminal-equipped wire functions as a water stop portion for suppressing the adhesion of moisture to the connection point of the terminal and the conductor. The primer layer is a layer containing a primer having affinity to the terminal made of metal and the heat shrinkable tube. Thus, the terminal and the heat shrinkable tube are particularly firmly bonded at the position of the primer layer and the intrusion of moisture to the connection point from the terminal side is effectively suppressed. Further, the olefin-based resin constituting the insulation coating of the wire is excellent in bondability to the heat shrinkable tube. Thus, even if the primer layer is absent between the heat shrinkable tube and the insulation coating, the intrusion of moisture to the connection point from the wire side is effectively suppressed. From these, the heat shrinkable tube of the terminal-equipped wire according to the embodiment is excellent in water stopping performance and reliability.

In the terminal-equipped wire according to the embodiment, a material of the insulation coating of the wire and a position where the primer layer is provided are optimally selected. Thus, the heat shrinkable tube exhibits high water stopping performance in the terminal-equipped wire for charging inlet exposed to a severe use environment. Moreover, high water stopping performance is maintained over a long period of time.

(2) As one aspect of the terminal-equipped wire according to the embodiment, the olefin-based resin is polyethylene or polypropylene.

Polyethylene and polypropylene are excellent in mechanical strength and insulation. Further, polyethylene and polypropylene are easily bonded to the heat shrinkable tube made of resin.

(3) As one aspect of the terminal-equipped wire according to the embodiment, the primer layer has a styrene-ethylene-butylene-styrene block copolymer (SEBS) as a main component.

SEBS has affinity to both metal constituting the terminal and resin constituting the heat shrinkable tube. Accordingly, SEBS is suitable as a material of the primer layer for improving the bondability of the heat shrinkable tube to the terminal. SEBS particularly firmly bonds the heat shrinkable tube having the olefin-based resin as the main component and the terminal.

(4) As one aspect of the terminal-equipped wire according to the embodiment, the heat shrinkable tube has an olefin-based resin as a main component.

If the heat shrinkable tube has the olefin-based resin as the main component, the outer peripheral surface of the heat shrinkable tube and the outer peripheral surface of the insulation coating of the wire are firmly bonded. This is because the heat shrinkable tube and the insulation coating made of the same type of materials are bonded.

Details of Embodiment of Present Disclosure

Hereinafter, an embodiment of a terminal-equipped wire of the present disclosure is described based on the drawings. The same reference signs in figures denote the same components. Note that the present invention is not limited to a configuration shown in the embodiment, but is represented by claims and intended to include all changes in the scope of claims and in the meaning and scope of equivalents.

Embodiment 1

Hereinafter, a terminal-equipped wire 1 according to the embodiment is described based on FIGS. 1 and 2.

Overall Configuration

Figure 2:
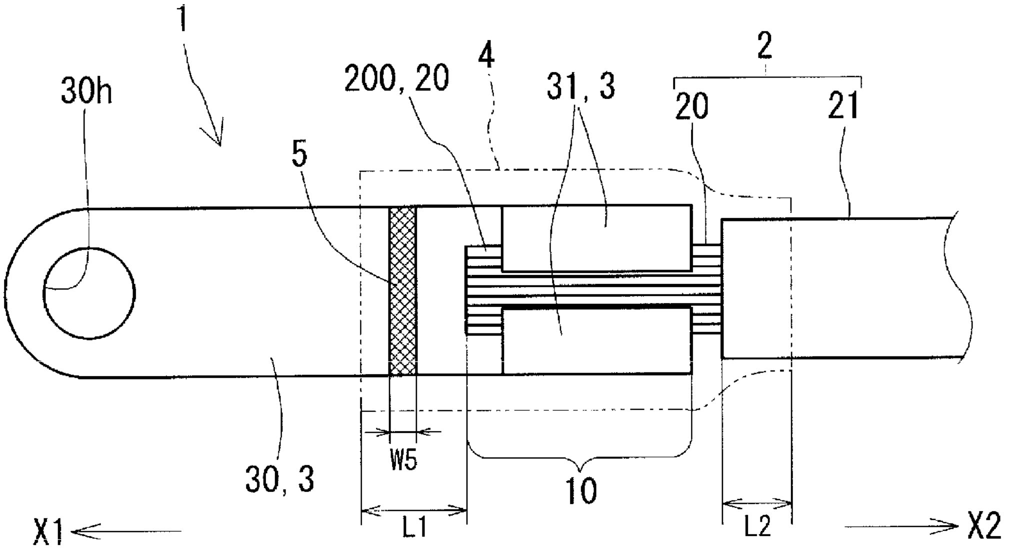
FIG. 2 is a schematic top view of the terminal-equipped wire for charging inlet according to the embodiment.

A terminal-equipped wire 1 of this example shown in FIG. 1 is used in a charging inlet to be mounted in an electrically driven vehicle. The use of the terminal-equipped wire 1 in the charging inlet can be specified from the size of the terminal-equipped wire 1 and the like. Similarly to a conventional configuration, this terminal-equipped wire 1 is provided with a wire 2 and a terminal 3. The terminal-equipped wire 1 of this example is further provided with a heat shrinkable tube 4 for constituting a water stop portion and a primer layer 5 for improving the water stopping performance of the heat shrinkable tube 4. Each component of the terminal-equipped wire 1 of this example is described below. In describing each component, a leftward direction toward the tip of the terminal-equipped wire 1 in figures is defined as a first direction X1 and a rightward direction away from the tip of the terminal-equipped wire 1 in figures is defined as a second direction X2.

Wire

The wire 2 includes a conductor 20 and an insulation coating 21 covering the outer periphery of the conductor 20. The wire 2 used in the charging inlet extends from the charging inlet to a battery. An entire length of the wire 2 is, for example, 500 mm or more and 2000 mm or less. The entire length of the wire 2 may be 1000 mm or more and 1800 mm or less. A branch part as in a wiring harness is not present in the wire 2 of this example.

An outer diameter of the conductor 20 is, for example, 13 mm or more. A large current flows in the wire 2 used in the charging inlet. If the outer diameter of the conductor 20 is 13 mm or more, a cross-sectional area of the conductor 20 capable of withstanding use with the large current is secured. The terminal-equipped wire 1 has a size mountable in the electrically driven vehicle. Accordingly, the outer diameter of the conductor 20 is practically preferably 20 mm or less. A preferable outer diameter of the conductor 20 is 16 mm or more and 18 mm or less.

The conductor 20 is a stranded wire obtained by stranding a plurality of strands 200. The strands 200 are, for example, made of copper, copper alloy, aluminum, aluminum alloy or the like.

The insulation coating 21 has an olefin-based resin as a main component. Polyethylene (PE), polypropylene (PP) or the like can be, for example, cited as the olefin-based resin. The olefin-based resin is excellent in bondability to the heat shrinkable tube 4 to be described later. General additives used in resin molding can be cited as substances contained in the insulation coating 21 other than the polyolefin-based resin. A stabilizer, an antioxidant, a lubricant, a filler, a colorant, a flame retardant and the like can be, for example, cited as the additives.

The olefin-based resin is poor in flexibility as compared to a silicone-based resin. Accordingly, the wire 2 provided with the insulation coating 21 made of olefin-based resin is slightly difficult to bend. However, since the wire 2 used in the charging inlet is long, a problem hardly occurs in the arrangement of the wire 2 in the electrically driven vehicle even if the wire 2 is slightly difficult to bend. The olefin-based resin is better in bondability to the heat shrinkable tube 4 than the silicone-based resin. In terms of improving the water stopping performance of the terminal-equipped wire 1, the olefin-based resin is better as a material of the insulation coating 21 than the silicone-based resin.

A thickness of the insulation coating 21 is, for example, 1.4 mm or more and 2.0 mm or less. A large current flows in the wire 2 used in the charging inlet. If the thickness of the insulation coating 21 is 1.4 mm or more and 2.0 mm or less, the insulation of the wire 2 in which the large current flows can be secured.

Terminal

The terminal 3 of this example includes a body portion 30 in the form of a flat plate and a wire barrel portion 31 provided in the body portion 30. A length of the body portion 30 is, for example, 10 mm or more and 24 mm or less. A thickness of the body portion 30 is, for example, 1.8 mm or more and 4.0 mm or less. The body portion 30 of this size can secure a sufficient conductor cross-sectional area.

The body portion 30 is provided with a through hole 30*h*. The through hole 30*h* is used to fix the terminal 3 to a housing of the charging inlet.

The wire barrel portion 31 grips the conductor 20 exposed from the insulation coating 21. Projecting pieces are provided on both sides of the body portion 30 and bent to sandwich the conductor 20, thereby configuring the wire barrel portion 31. An insulation barrel for gripping the insulation coating 21 of the wire 2 is not present in the terminal 3 of this example.

The terminal 3 is made of metal excellent in electrical conductivity. For example, the terminal 3 is made of copper, copper alloy, aluminum, aluminum alloy, nickel, nickel alloy or the like. A plating layer may be provided on the surface of the terminal 3. Tin and the like can be, for example, cited as a material of the plating layer.

Heat Shrinkable Tube

The heat shrinkable tube 4 functions as a water stop portion for suppressing the adhesion of moisture to a connection point 10 of the conductor 20 of the wire 2 and the terminal 3. The heat shrinkable tube 4 of this example covers a region from the connection point 10 of the terminal 3 and the conductor 20 to the insulation coating 21 of the wire 2. The connection point 10 means an entire part in which the conductor 20 and the terminal 3 overlap in a length direction of the conductor 20. Accordingly, the connection point 10 includes the entire wire barrel portion 31 gripping the conductor 20, a part of the body portion 30 corresponding to the conductor 20 and a part of the conductor 20 arranged on the body portion 30. In other words, the heat shrinkable tube 4 covers the outer periphery of the conductor 20 so that the conductor 20 is not exposed to an outside environment.

The heat shrinkable tube 4 extends further than the tip of the conductor 20 in the first direction X1. A distance L1 between an end part of the heat shrinkable tube 4 and the tip of the conductor 20 in the first direction X1 is, for example, 5 mm or more and 15 mm or less. If the distance L1 is 5 mm or more, a sufficient contact area of the terminal 3 and the heat shrinkable tube 4 is secured. As a result, the bonding of the terminal 3 and the heat shrinkable tube 4 is strengthened. If the distance L1 is 15 mm or less, the heat shrinkable tube 4 does not become excessively long. The distance L1 is more preferably 7 mm or more and 10 mm or less.

A distance L2 between an end part of the heat shrinkable tube 4 and an end surface of the insulation coating 21 in the second direction X2 is, for example, 5 mm or more and 15 mm or less. If the distance L2 is 5 mm or more, a sufficient contact area of the insulation coating 21 and the heat shrinkable tube 4 is secured. As a result, the bonding of the insulation coating 21 and the heat shrinkable tube 4 is strengthened. If the distance L2 is 15 mm or less, the heat shrinkable tube 4 does not become excessively long. The distance L2 is more preferably 7 mm or more and 10 mm or less.

A thickness of the heat shrinkable tube 4 is preferably 2 mm or more and 4 mm or less. The heat shrinkable tube 4 adheres to the connection point 10 by being heated after being fit to the connection point 10 in an assembly of the wire 2 and the terminal 3. The thickness of the heat shrinkable tube 4 hardly changes before and after a heating treatment.

The heat shrinkable tube 4 has resin as a main component. The resin is preferably an olefin-based resin. PE can be, for example, cited as the olefin-based resin. The olefin-based resin is excellent in heat resistance, durability and strength. The heat shrinkable tube 4 having the olefin-based resin as the main component is easily bonded to the insulation coating 21 made of olefin-based resin. As a result, the water stopping performance and reliability of the heat shrinkable tube 4 are improved.

General additives used in resin molding can be cited as components other than the resin in the heat shrinkable tube 4. A stabilizer, an antioxidant, a lubricant, a filler, a colorant, a flame retardant and the like can be, for example, cited as the additives.

Primer Layer

The primer layer 5 is a layer containing a primer for improving the bondability of the heat shrinkable tube 4 to the terminal 3. The primer layer 5 is provided between the inner peripheral surface of the heat shrinkable tube 4 and the outer peripheral surface of the terminal 3. More specifically, the primer layer 5 is provided between a part of the inner peripheral surface of the heat shrinkable tube 4 and a part of the outer peripheral surface of the body portion 30 of the terminal 3. The primer layer 5 is provided at a position further than the tip of the conductor 20 in the first direction X1.

The primer layer 5 is annularly formed around the outer periphery of the body portion 30. The primer layer 5 of this example is not divided in a circumferential direction of the body portion 30. A width W5 of the primer layer 5 is preferably 3 mm or more and 10 mm or less. If the width W5 is 3 mm or more, the heat shrinkable tube 4 is firmly bonded to the terminal 3. If the width W5 is 10 mm or less, the enlargement of the heat shrinkable tube 4 can be avoided. The width W5 is more preferably 4 mm or more and 6 mm or less.

The primer layer 5 has a primer having affinity to both metal and resin as a main component. The primer is preferably a styrene-ethylene-butylene-styrene block copolymer (SEBS). Further, the primer is more preferably a partially acid-modified SEBS and such a SEBS has affinity to both the terminal 3 and the heat shrinkable tube 4. Therefore, the bondability of the heat shrinkable tube 4 to the terminal 3 is improved by the primer layer 5.

The primer layer 5 is formed by applying a primer solution, in which the primer is dissolved in a solvent, to the terminal 3. The primer solution is dried after being applied to the terminal 3. By forming the heat shrinkable tube 4 to include a part applied with the primer solution, the primer layer 5 is formed between the terminal 3 and the heat shrinkable tube 4. Organic solvents such as acetone and toluene can be cited as the solvent of the primer solution. The primer layer 5 may contain part of the solvent.

Miscellaneous

In the terminal-equipped wire 1 of this example, the inner peripheral surface of the heat shrinkable tube 4 and the outer peripheral surface of the insulation coating 21 are directly in contact. The heat shrinkable tube 4 is easily bonded to the outer periphery of the insulation coating 21 made of resin since having the resin as the main component. Therefore, the heat shrinkable tube 4 and the insulation coating 21 are firmly bonded even if the primer is not present between the heat shrinkable tube 4 and the insulation coating 21.

Effects

The heat shrinkable tube 4 of the terminal-equipped wire 1 of this example suppresses the adhesion of moisture to the connection point 10 of the terminal 3 and the conductor 20. The primer layer 5 provided between this heat shrinkable tube 4 and the terminal 3 strengthens the bonding of the heat shrinkable tube 4 and the terminal 3. Thus, the intrusion of moisture to the connection point 10 from the side of the terminal 3 in the heat shrinkable tube 4 is effectively suppressed. Further, the olefin-based resin constituting the insulation coating 21 of the wire 2 is excellent in bondability to the heat shrinkable tube 4. Thus, the intrusion of moisture to the connection point 10 from the side of the wire 2 in the heat shrinkable tube 4 is effectively suppressed.

In the terminal-equipped wire 1 of this example, the material of the insulation coating 21 of the wire 2, that of the heat shrinkable tube 4 and that of the primer layer 5 are optimally selected. Thus, the heat shrinkable tube 4 exhibits high water stopping performance in the terminal-equipped wire 1 for charging inlet exposed to a severe use environment. Moreover, high water stopping performance is maintained over a long period of time.

In the terminal-equipped wire 1 of this example, a small part of the inner peripheral surface of the heat shrinkable tube 4 is in contact with the primer layer 5. Therefore, the terminal-equipped wire 1 of this example is better in terms of time and effort for production and cost than a configuration in which the primer layer 5 is provided on the entire inner peripheral surface of the heat shrinkable tube 4.

Test Example 1

In Test Example 1, a plurality of terminal-equipped wires different in the configuration of a primer layer were produced and the water stopping performance of a heat shrinkable tube in each terminal-equipped wire was examined.

Sample No. 1

The terminal-equipped wire 1 of Sample No. 1 is the terminal-equipped wire 1 having a structure shown in FIG. 1 of the embodiment. Dimensions and materials of the respective components are as follows.

Wire 2
Entire length . . . 500 mm
Diameter . . . 16.9 mm
Thickness of insulation coating 21 . . . 1.6 mm
Material of insulation coating 21 . . . PE resin
Terminal 3
Material . . . copper terminal with tin plating
Heat shrinkable tube 4
Length . . . 30 mm
Thickness . . . 1.2 mm
Material . . . PE resin
Primer layer 5
Width W5 . . . 4 mm
Material . . . primer having a SEBS as a main component Test on Water Stopping Performance First, to reproduce the aging of the terminal-equipped wire 1 of Sample No. 1, an acceleration test was conducted by leaving the terminal-equipped wire 1 of Sample No. 1 in the following environment.

Temperature . . . 85° C.
Humidity . . . 85%
Time . . . 120 hours

Subsequently, assuming a temperature when the terminal-equipped wire 1 of Sample No. 1 is used, the terminal-equipped wire 1 of Sample No. 1 was left in an atmosphere of 120° C.

Finally, the heat shrinkable tube 4 of the terminal-equipped wire 1 of Sample No. 1 was arranged in cold water, and air was fed into the inside of the wire 2 at a pressure of 10 kPa from an end part of the terminal-equipped wire 1 on a side opposite to the heat shrinkable tube 4. Then, it was visually confirmed that a pressure value of a pressure meter indicated 10 kPa or more. If the pressure value of this pressure meter largely drops, it can be judged that leakage occurred at the position of the heat shrinkable tube 4. The occurrence of leakage means that water is insufficiently stopped by the heat shrinkable tube 4.

Leakage did not occur in the terminal-equipped wire 1 of Sample No. 1 in which the primer layer 5 was made of SEBS. Therefore, water stop between the terminal 3 and the heat shrinkable tube 4 is thought to be ensured by the primer layer 5. Further, water stop between the insulation coating 21 of the wire 2 and the heat shrinkable tube 4 is thought to be ensured even if a bonding auxiliary layer equivalent to the primer layer 5 is absent. From this result, it was found that the water stopping performance of the heat shrinkable tube 4 was maintained over a long period of time according to the terminal-equipped wire 1 having the configuration according to the embodiment.

LIST OF REFERENCE NUMERALS

1 terminal-equipped wire
10 connection point
2 wire
20 conductor
21 insulation coating
200 strand
3 terminal
30 body portion
31 wire barrel portion
30*h* through hole
4 heat shrinkable tube
5 primer layer
L1, L2 distance
W5 width
X1 first direction
X2 second direction

What is claimed is:

1. A terminal-equipped wire for charging inlet, comprising:

a wire including a conductor and an insulation coating, an outer diameter of the conductor being 13 mm or more, the insulation coating having an olefin-based resin as a main component;

a terminal to be connected to the conductor exposed from an end part of the wire;

a heat shrinkable tube for covering a region from a connection point of the conductor and the terminal to the insulation coating; and a primer layer provided between an inner peripheral surface of the heat shrinkable tube and an outer peripheral surface of the terminal, the inner peripheral surface of the heat shrinkable tube and an outer peripheral surface of the insulation coating being directly in contact, a direction toward a tip of the terminal being a first direction, the heat shrinkable tube extending further than a tip of the conductor in the first direction, and the primer layer having an annular shape and being disposed around an outer periphery of a part of the terminal located further than the tip of the conductor in the first direction, wherein the annular shape of the primer layer has a width determined by a first primer layer edge extending in the first direction and a second primer layer edge extending in a second direction opposite to the first direction, the second primer layer edge being located further than the tip of the conductor in the first direction, and wherein the primer layer is fully disposed between an end part of the heat shrinkable tube toward the terminal and the tip of the conductor, such that the first primer layer edge is disposed a distance from the end part of the heat shrinkable tube and such that the region of the terminal covered by the heat shrinkable tube includes a region of the terminal arranged further than the first primer layer edge in the first direction.

2. The terminal-equipped wire of claim 1, wherein the olefin-based resin is polyethylene or polypropylene.

3. The terminal-equipped wire of claim 1, wherein the primer layer has a styrene-ethylene-butylene-styrene block copolymer as a main component.

4. The terminal-equipped wire of claim 1, wherein the heat shrinkable tube has an olefin-based resin as a main component.

* * * * *